United States Patent
Kasichainula

(10) Patent No.: US 12,418,488 B2
(45) Date of Patent: Sep. 16, 2025

(54) MULTI-STREAM SCHEDULING FOR TIME SENSITIVE NETWORKING

(71) Applicant: Intel Corporation, Santa Clara, CA (US)

(72) Inventor: Kishore Kasichainula, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 17/559,921

(22) Filed: Dec. 22, 2021

(65) Prior Publication Data
US 2022/0311710 A1 Sep. 29, 2022

(51) Int. Cl.
*H04L 47/2441* (2022.01)
*H04L 47/28* (2022.01)
*H04L 47/62* (2022.01)
*H04L 49/90* (2022.01)

(52) U.S. Cl.
CPC .......... *H04L 47/2441* (2013.01); *H04L 47/28* (2013.01); *H04L 47/622* (2013.01); *H04L 49/9026* (2013.01)

(58) Field of Classification Search
CPC .................. H04L 47/2441; H04L 47/28; H04L 47/622; H04L 47/801; H04L 47/805; H04L 47/826; H04L 49/901; H04L 49/9026; H04L 49/9068
See application file for complete search history.

(56) References Cited

U.S. PATENT DOCUMENTS

| | | | |
|---|---|---|---|
| 9,565,035 B1 * | 2/2017 | Pannell | H04L 49/201 |
| 2004/0131014 A1 * | 7/2004 | Thompson, III | H04H 60/06 |
| | | | 370/312 |
| 2004/0260829 A1 * | 12/2004 | Husak | H04L 49/203 |
| | | | 709/232 |
| 2006/0023716 A1 * | 2/2006 | Fischer | H04L 49/901 |
| | | | 370/389 |
| 2020/0259896 A1 | 8/2020 | Sachs et al. | |
| 2021/0097019 A1 | 4/2021 | Kasichainula | |
| 2021/0117353 A1 | 4/2021 | Kasichainula et al. | |

(Continued)

FOREIGN PATENT DOCUMENTS

EP 4203432 A1 * 6/2023 ......... H04L 47/2441

OTHER PUBLICATIONS

"European Application Serial No. 22203720.2, Extended European Search Report mailed Apr. 21, 2023", 10 pgs.

(Continued)

*Primary Examiner* — Wutchung Chu
(74) *Attorney, Agent, or Firm* — Schwegman Lundberg & Woessner, P.A.

(57) ABSTRACT

A network interface device for implementing multi-stream scheduling for time sensitive networking includes direct memory access (DMA) circuitry, comprising: descriptor parsing circuitry to read a packet descriptor from a descriptor cache, wherein the packet descriptor includes at least one scheduling control parameter including: a launch time offset, a gate cycle offset, or a reduction ratio; wherein the packet descriptor is associated with a packet stream having a traffic class; and scheduling circuitry to schedule packets from the packet stream for transmission using the at least one scheduling control parameter.

15 Claims, 8 Drawing Sheets

(56) References Cited

U.S. PATENT DOCUMENTS

| | | | | |
|---|---|---|---|---|
| 2021/0149603 | A1* | 5/2021 | Kobayashi | G06F 9/45558 |
| 2021/0152635 | A1* | 5/2021 | Kobayashi | H04L 49/70 |
| 2021/0306910 | A1 | 9/2021 | Guo et al. | |
| 2021/0377189 | A1* | 12/2021 | Yamaura | H04L 47/2441 |
| 2022/0197841 | A1* | 6/2022 | Yamaura | G06F 13/287 |
| 2022/0237009 | A1* | 7/2022 | Kobayashi | G06F 9/4555 |
| 2022/0311710 | A1* | 9/2022 | Kasichainula | H04L 47/2441 |
| 2023/0171198 | A1* | 6/2023 | Oge | H04L 47/56 370/429 |
| 2023/0171200 | A1* | 6/2023 | Yamaura | H04L 47/283 370/392 |

OTHER PUBLICATIONS

"European Application Serial No. 22203720.2, Response filed Dec. 20, 2023 to Extended European Search Report mailed Apr. 21, 2023", 10 pgs.

\* cited by examiner

| BIT31 | | | BIT0 |
|---|---|---|---|
| BUFFER [31:0]/HEADER ADDRESS [31:0] | | | |
| BUFFER [63:32]/BUFFER ADDRESS [31:0] | | | |
| BUFFER LENGTH [15:0] | | HEADER LENGTH [15:0] | |
| RESERVED [15:0] | | FRAME/PAYLOAD LENGTH [15:0] | |
| LAUNCH TIME OFFSET [31:0] | | | |
| RESERVED [15:0] | REDUCTION RATIO [7:0] | GATING CYCLE OFFSET [7:0] | |
| RESERVED [31:0] | | | |
| CONTROL BITS [31:0] | | | |

DESCRIPTOR

*FIG. 6*

MULTI-STREAM SCHEDULING FOR TIME SENSITIVE NETWORKING

TECHNICAL FIELD

Embodiments described herein generally relate to data communication systems and in particular to a multi-stream scheduling for time sensitive networking.

BACKGROUND

Currently, network cards transmit and receive data packets. As network use grows and additional systems come online to serve more data to more end users, data communication services need to become faster and more efficient. At the network card level, effective and deterministic packet processing is needed to increase throughput in a network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 6 is a block diagram illustrating a descriptor, according to an embodiment;

DETAILED DESCRIPTION

Figure 1:
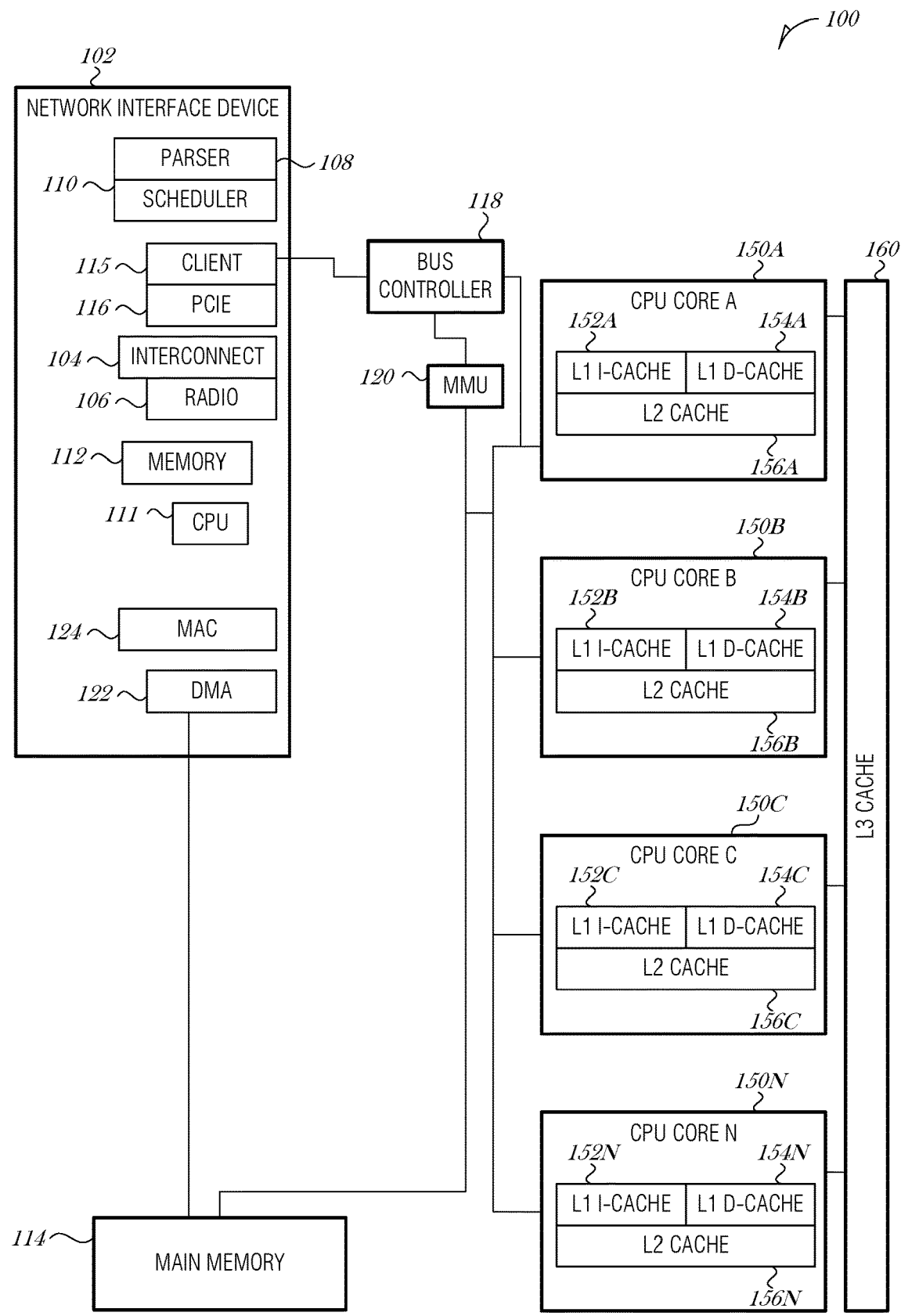
FIG. 1 is a schematic diagram illustrating an operating environment, according to an embodiment.

In the following description, for purposes of explanation, numerous specific details are set forth in order to provide a thorough understanding of some example embodiments. It will be evident, however, to one skilled in the art that the present disclosure may be practiced without these specific details.

The emerging IEEE standards for deterministic networking referred to collectively as Time Sensitive Networking (TSN) provide extremely precise data transfer across the network. As a result, embedded designs in the industrial and automotive space are increasingly integrating TSN controllers. The inevitable convergence of information technology (IT) and operational technology (OT), workload consolidation, and demand for seamless communication across many connected devices necessitates transfer of various types of data traffic through a network interface card (NIC) without sacrificing the latencies for hard real-time applications.

To address these different types of traffic, the IEEE 802.1Q standard defined eight traffic classes with corresponding priorities. To support these eight traffic classes, the current generation of NICs implemented eight transmit (Tx) and eight receive (Rx) queues with each pair of transmit and receive queues dedicated to one of the eight traffic classes.

The IEEE standards, such as 802.1Qbv, defined a gate control list (GCL) for precisely scheduling streams based on traffic class. Hence, NICs designed based on these standards are capable of transmitting (or receiving) multiple streams with different traffic classes and priorities. However, such NICs can only transmit (or receive) one stream for a given traffic class and priority. In other words, only eight data streams, each belonging to a different traffic class, can be scheduled by the current NICs. This is because there is only gate per traffic class and the GCL is based on the traffic class and not based on the number of data streams.

In industrial applications, there may be multiple data streams belonging to same traffic class. In this situation, to schedule these multiple streams belonging to same traffic class, the application software or middleware must implement an additional software scheduler to merge and sequence all streams that belong to same traffic type and priority into a single stream, and then into a single descriptor ring so that the hardware can schedule these streams at appropriate launch times.

Though the current standards provide QoS based on traffic class, NICs designed to these standards are not capable of scheduling multiple streams per traffic class directly by the NIC. The additional merging and sequencing of multiple streams of same traffic class by the software is a huge overhead to the application and it steals a considerable amount of CPU cycles. It also contributes to software induced latency and jitter which is not desirable for hard real-time applications.

What is needed is a mechanism to schedule multiple streams per traffic class directly by the NIC. The systems and mechanisms described here provide multiple stream support with time-based scheduling and packet latencies less than 10 µs. Descriptors are modified to add special parameters to achieve this. These parameters are added to precisely fetch data and transmit the packets. Variables like reduction ratios, phase offset, gating cycle number, and launch time are defined in addition to the traffic class of a particular stream to provide more fine-grained scheduling control.

The systems and methods described here eliminate software overhead, offload CPU for other tasks, and improve the latency and jitter. It also provides more area on a package or die, and is more power efficient. The architecture has dedicated DMA channels and prefetch cache for each data stream, but the packet buffers are still based on the traffic class. Only eight transmit and eight receive packet buffers are needed. The descriptor parser is enhanced and has an additional scheduler to arbitrate and sequence data streams before the data streams are pushed into transmit packet buffers, which then are scheduled using any IEEE standard-defined scheduling algorithm. The descriptors are modified to add three new fields called "launch time offset," "gating cycle offset," and "reduction ratio." The additional scheduler in the DMA decodes these newly defined fields in the descriptor and pushes the data packets into corresponding packet queues at the appropriate time based on the parameters.

A gating cycle is a time during which all entries in a gate control list are processed. The entries in the gate control list indicate which traffic class queue is to be transmitted and for how long. In the examples shown here, the duration of the gating cycle is divided equally amongst the traffic classes in the gate control list. However, it is understood that any allotment of time between traffic classes may be used. The launch time offset is used to delay a packet transmission within a gating cycle. The gating cycle offset is used to specify how many gating cycles to delay the initial packet from a data stream before the data stream is transmitted. The reduction ratio provides a way to control the repeat interval of a packet stream. A reduction ratio of "1" indicates that packets from the stream are to be transmitted every gating cycle, "2" indicates that packets are to be transmitted every two gating cycles (e.g., every other gating cycle), "4" indicates that the packets are to be transmitted every four gating cycles, etc. Using these parameters, the packet streams can be scheduled with fine granularity. Additional details are provided below.

FIG. 1 is a schematic diagram illustrating an operating environment 100, according to an embodiment. The operating environment 100 may be a server computer, desktop computer, laptop, wearable device, hybrid device, onboard vehicle system, network switch, network router, or other compute device capable of receiving and processing network traffic. The operating environment 100 includes a network interface device (NID) 102. The NID 102 includes electronic circuitry to support the data link layer with the physical layer. In particular, the NID 102 is able to receive data using an interconnect 104 or radio 106. The interconnect 104 is arranged to accept signals over a physical media, where the signals are arranged into some supported L2 framing, and interpret the incoming signal stream as a stream of bits organized into L2 units called "frames." The interconnect 104 may be an Ethernet port, for example. The radio 106 is able to send and receive radio frequency (RF) data and is used to communicate over wireless protocols, such as WiFi, Bluetooth, Zigbee, cellular communications, and the like. Other types of communication interfaces may be supported by NID 102, such as Gigabit Ethernet, ATM, HSSI, POS, FDDI, FTTH, and the like. In these cases, appropriate ports may be provided in the NID architecture.

The NID 102 includes circuitry, such as a packet parser 108 and a scheduler circuit 110. The packet parser 108 and the scheduler circuit 110 may use NID memory 112 or main memory 114 for various operations such as queuing packets, saving state data, storing historical data, supporting a neural network, or the like.

The NID 102 also includes a direct memory access (DMA) circuit 122 and media access control (MAC) circuit 124 (also referred to as medium access control (MAC)). The DMA circuit 122 may be used to access main memory 114 through a fabric (e.g., Intel On-Chip System Fabric (IOSF)). The DMA circuit 122 interfaces with the MAC circuit 124 to prepare frames for transmission. The MAC circuit 124 is able to perform: frame delimiting and recognition; addressing of destination stations (both as individual stations and as groups of stations), conveyance of source-station addressing information, provide transparent data transfer of LLC PDUs or of equivalent information in the Ethernet sublayer, protection against errors, generally by means of generating and checking frame check sequences, and control of access to the physical transmission medium. In the case of Ethernet, the functions required of a MAC circuit 124 is to: receive/transmit normal frames; provide half-duplex retransmission and backoff functions; append/check FCS (frame check sequence); enforce interframe gap; discard malformed frames; prepend(tx)/remove(rx) preamble, SFD (start frame delimiter), and padding; and provide half-duplex compatibility: append(tx)/remove(rx) MAC address.

The packet parser 108, scheduler circuit 110, DMA circuit 122, and MAC circuit 124 may be implemented using an on-NID CPU 111, an ASIC, an FPGA, or other type of computing unit on the NID 102. Further, portions of the packet parser 108, scheduler circuit 110, DMA circuit 122, and MAC circuit 124 may be incorporated into common circuitry, on a same die, or virtualized. It is understood that various arrangements of these components may be used according to available power, area, design, or other factors.

The operating environment 100 also includes central processing unit (CPU) cores 150A, 150B, 150C, and 150N (collectively referred to as 150A-N). Although four cores are illustrated in FIG. 1, it is understood that more or fewer cores may exist in particular CPU architectures. Additionally, there may be multiple CPUs logically grouped together to create a CPU complex. Mechanisms described herein may be used for a single-core CPU, a multi-core CPU, or multiple CPUs acting in concert.

The NID 102 may communicate with the cores 150A-N, main memory 114, or other portions of operating environment 100 via a suitable interconnect channel, such as Peripheral Component Interconnect Express (PCIe) connector 116. PCIe connector 116 may be of any width (e.g., x1, x4, x12, x16, or x32). Other interconnect channels include Intel On-Chip System Fabric (IOSF), QuickPath Interconnect (QPI), and Primary Scalable Fabric (PSF).

The NID 102 may communicate with cores 150A-N over a bus, such as a PCIe bus. A PCIe client 115 controls the bus and the PCIe connector 116 in the NID 102 that interfaces with a bus controller 118. The PCIe client 115 may perform additional functions, such as controlling allocation of internal resources to virtual domains, support various forms of I/O virtualization (e.g., single root input/output virtualization (SR-IOV)), and other functions. The PCIe bus controller 118 may be incorporated into the same die that includes the cores 150A-N. A platform controller hub may include the PCIe bus controller 118, memory management unit (MMU) 120, Serial ATA controllers, Universal Serial Bus (USB) controllers, clock controller, trusted platform module (TPM), serial-peripheral interface (SPI), and other components in the processor die.

Modern processor architectures have multiple levels in the cache hierarchy before going to main memory. In many designs the outermost level of cache is shared by all cores on the same physical chip (e.g., in the same package) while the innermost cache levels are per core.

In the example illustrated in FIG. 1, each CPU core 150A-N includes a corresponding L1 cache, separated into an L1 instruction cache 152A, 152B, 152C, 152N (collectively referred to as 152A-N) and an L1 data cache 154A, 154B, 154C, 154N (collectively referred to as 154A-N). The cores 150A-N also each include an L2 cache 156A, 156B, 156C, 156N (collectively referred to as 156A-N). The size of the L1 caches and L2 caches vary depending on the processor design. Conventional sizes range from 32 KB to 64 KB for L1 cache size (e.g., 16 KB instruction and 16 KB data, or 32 KB instruction and 32 KB data), and 256 KB to 512 KB for L2 cache size. L3 cache size may vary from 8 MB to 12 MB or more.

Figure 2:
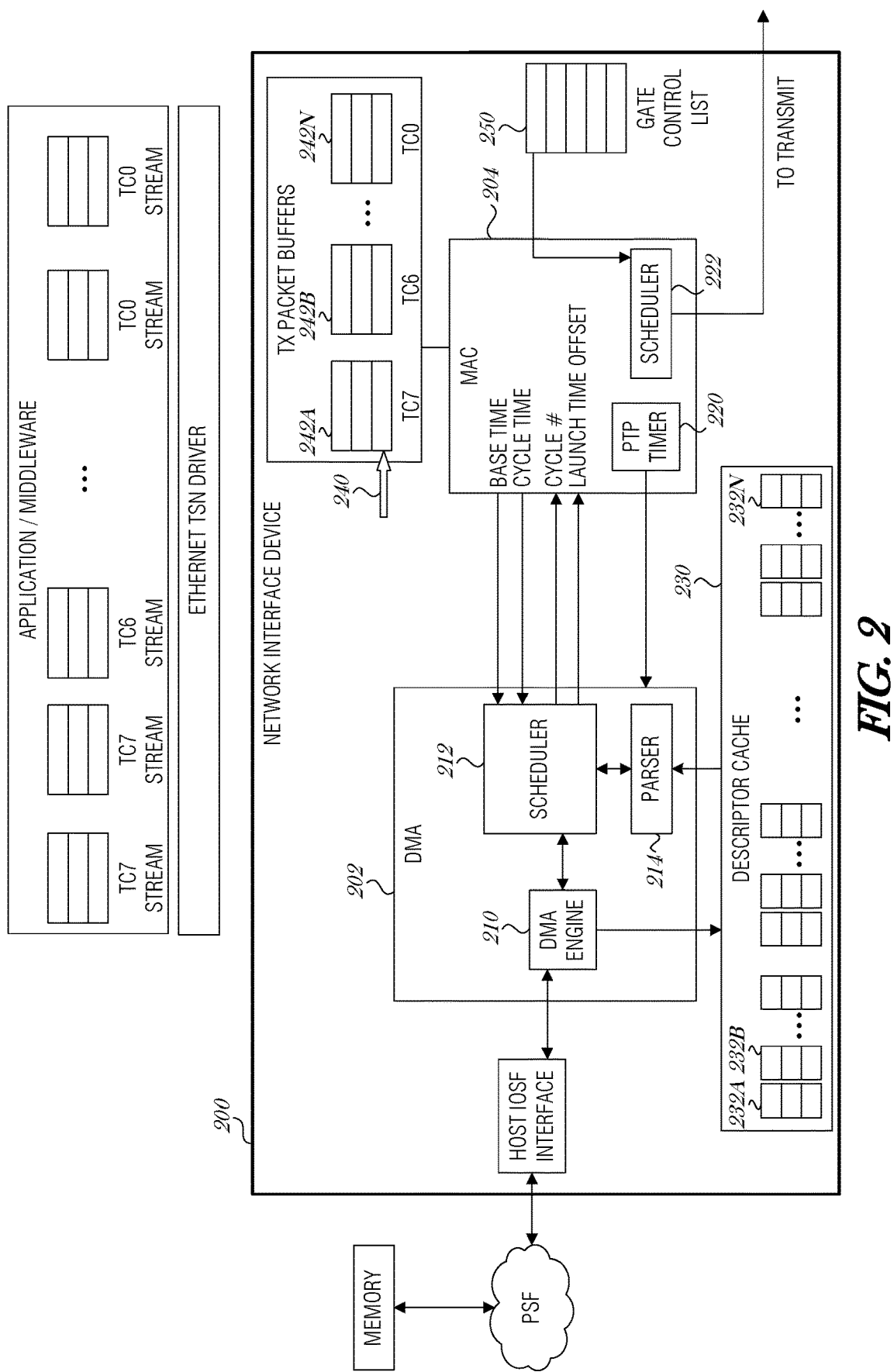
FIG. 2 is a is a schematic diagram illustrating a network interface device (NID) for time sensitive networking (TSN), according to an embodiment.

FIG. 2 is a schematic diagram illustrating a NID 200 for time sensitive networking (TSN), according to an embodiment. The NID 200 includes a DMA circuitry 202 and MAC circuitry 204 to transmit packets in a time sensitive network environment. The DMA circuitry 202 includes a multichannel transmit DMA engine 210, a reduction ratio based scheduler 212, and a descriptor parsing circuitry 214. The MAC circuitry 204 includes a Precision Time Protocol (PTP) timer 220 and a gate control list (GCL) based scheduler 222.

A transmit descriptor cache 216 is used by the multichannel transmit DMA engine 210 and the descriptor parsing circuitry 214. The transmit descriptor cache 230 includes a separate queue for each channel In an embodiment, 128 transmit channels and 128 receive channels supported by the DMA engine 210. It is understood that there may be more or fewer transmit and receive channels. Each DMA channel processes one ring buffer and each ring buffer is mapped to one of the eight traffic classes (TC0-TC7) as defined by a user.

The descriptors are prefetched and stored in a descriptors cache 230 to reduce end-to-end transmit latency. Each channel has an associated descriptor prefetch cache 232A, 232B, . . . , 232N (collectively referred to as 232A-N).

The DMA engine 210 prefetches all the available descriptors in a burst when the tail pointer 240 of a transmit packet buffer 242A, 242B, . . . , 242N (collectively referred to as 242A-N) is advanced. Each transmit buffer 242A-N has a corresponding tail pointer that points to the buffer entry after the last valid buffer entry. Once the descriptors are prefetched into the descriptor cache 230, the descriptor parsing circuitry 214 decodes the fields in the descriptors and passes these values to the reduction ratio based scheduler 212. The descriptor fields include those described above: launch time offset, gating cycle offset, and reduction ratio.

The reduction ratio based scheduler 212 performs two functions for every packet that needs to be transmitted. First, it computes the gating cycle number and second, it computes the launch time. The gating cycle number specifies the cycle the MAC circuitry 204 should transmit a particular packet. The launch time specifies the precise time the packet should be transmitted within that gating cycle. The reduction ratio based scheduler 212 communicates the gating cycle number and launch time to the MAC circuitry 204.

The PTP timer 220 is used to synchronize clocks with the reduction ratio based scheduler 212. The MAC circuitry 204 provides the base time and cycle time to the reduction ratio based scheduler 212. The base time is the beginning time of the gating cycle. A gating cycle is a period and used to cycle through active classes in the gate control list 250. The cycle time is the duration of the gating cycle. The cycle time used in these examples is 100 μs; however it is understood that any duration may be used as the cycle time.

The GCL-based scheduler 222 uses a gate control list 224 to determine from which ring buffer to read and transmit packets from. Because ring buffers are associated with traffic classes, the GCL-based scheduler 222 effectively schedules per traffic class from several ring buffers. This is described more in FIGS. 3-5 below.

Figure 3:
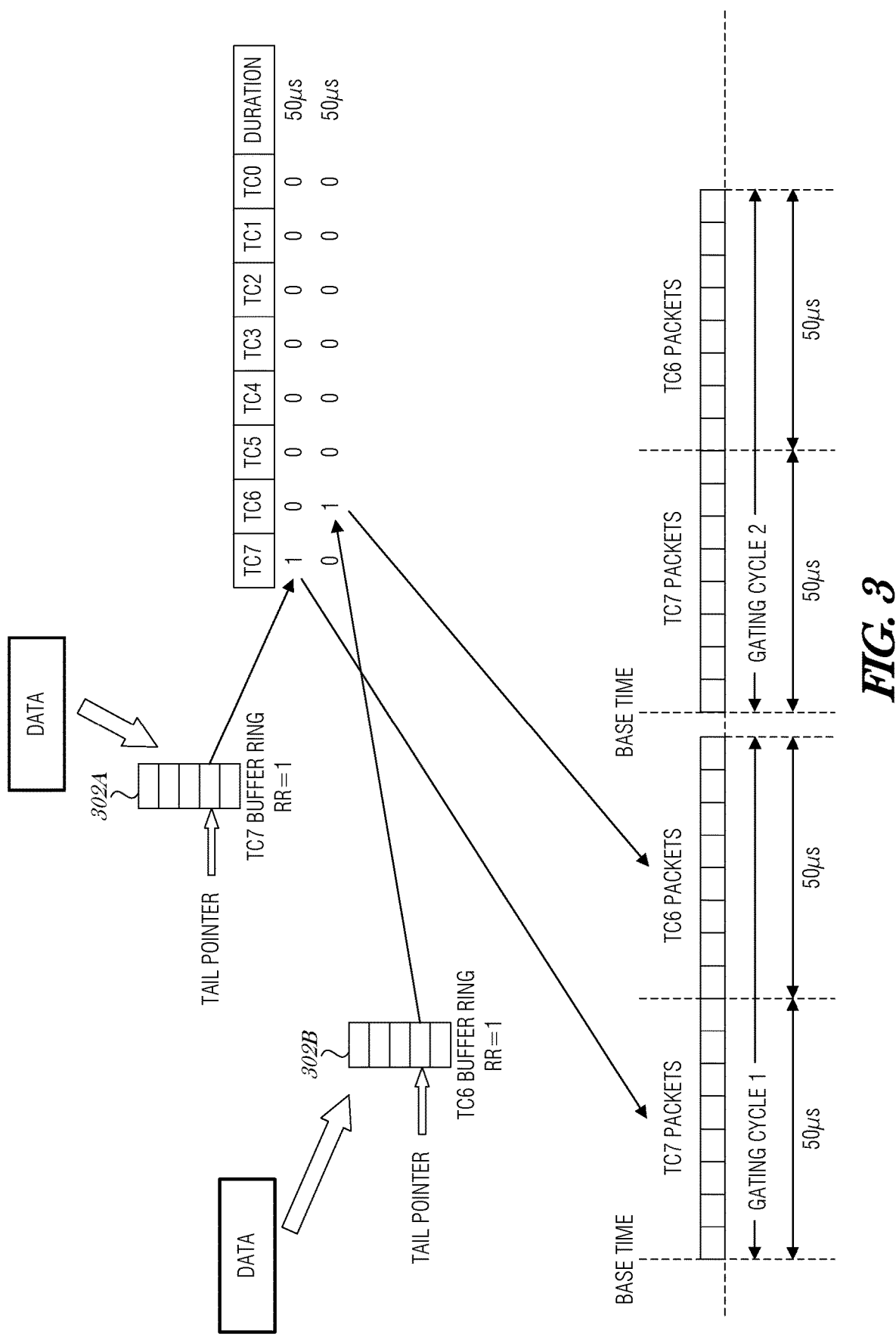
FIG. 3 is a schematic diagram illustrating transmit processing, according to an embodiment.

FIG. 3 is a schematic diagram illustrating transmit processing, according to an embodiment. In FIG. 3, the NID is configured to transmit one stream per traffic class. These streams are transmitted every gating cycle. In current architectures, there is no concept of reduction ratios. Here, the reduction ratio may be considered to be one, such that every stream is transmitted on every gating cycle.

Figure 4:
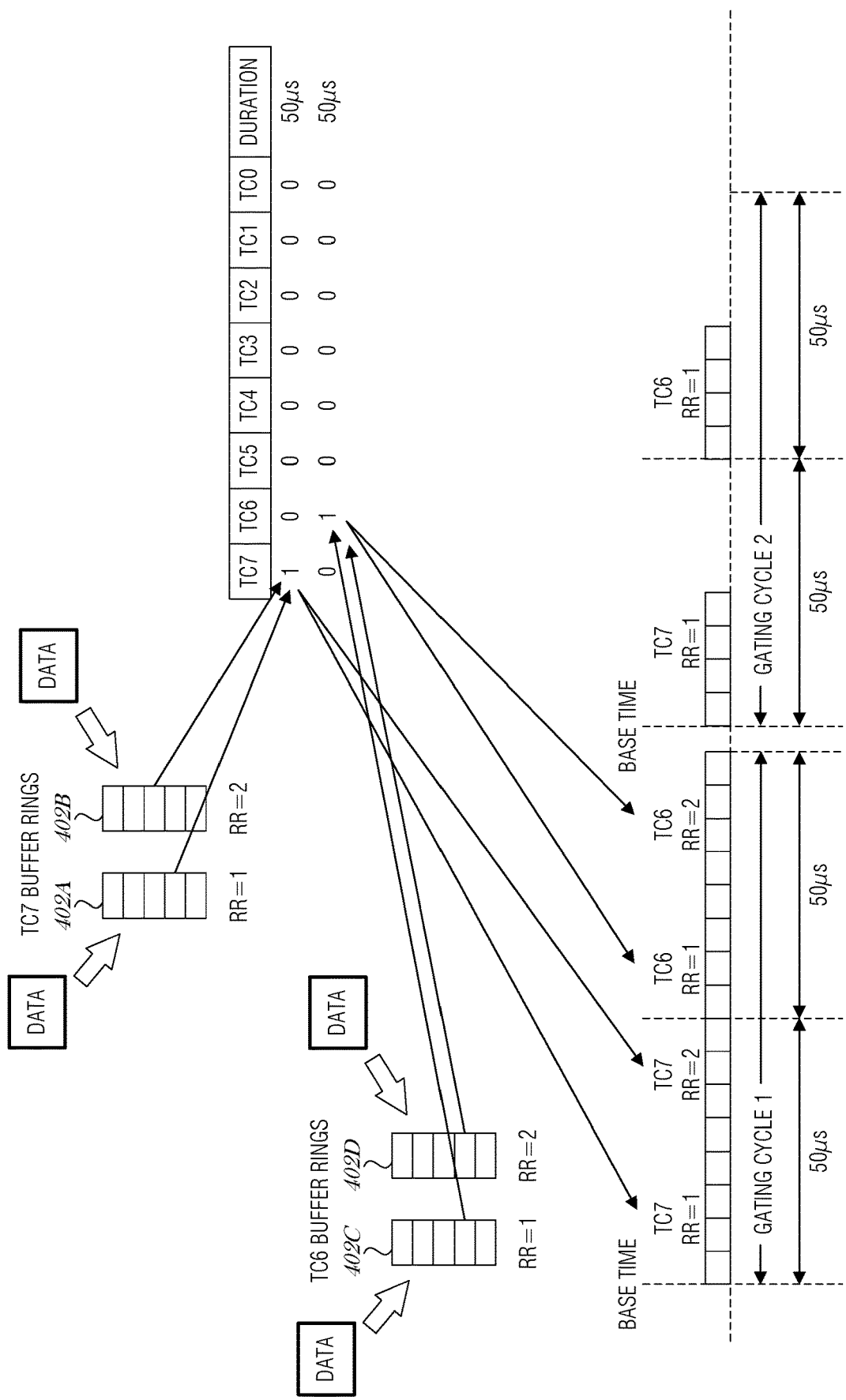
FIG. 4 is a schematic diagram illustrating transmit processing of multiple streams, according to an embodiment.
Figure 5:
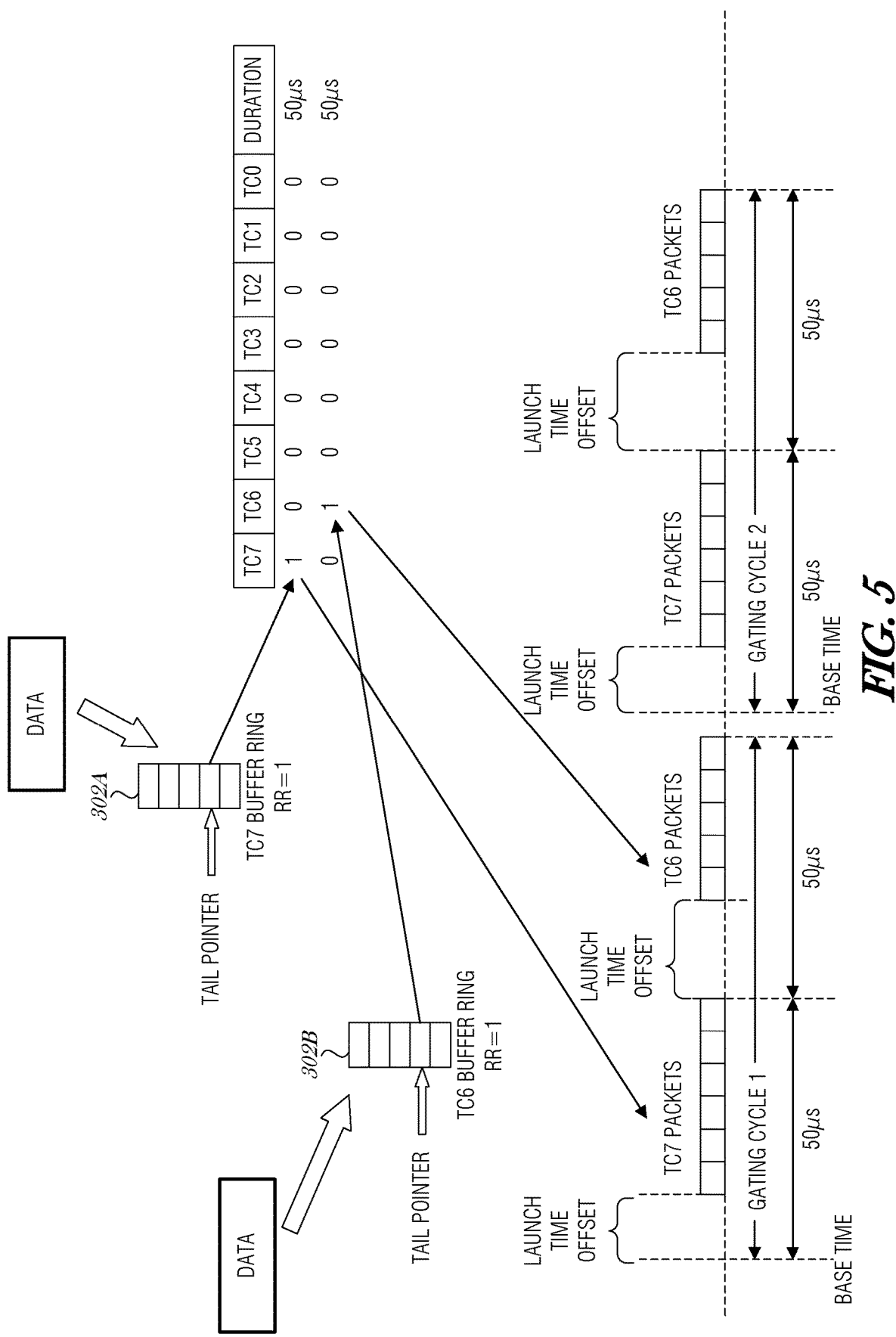
FIG. 5 is a schematic diagram illustrating transmit processing of multiple streams with a launch time offset, according to an embodiment.

For the examples illustrated in FIGS. 3-5, the gating cycle duration is assumed to be 100 μs. It is understood that the gating cycle may be set to a different duration.

In FIG. 3, there are only two streams set to be transmitted in the gate control list 300. A bit map is used to indicate which traffic class is active. In the example shown, each traffic class is given a substantially equal amount of time during the gating cycle to transmit packets of that class.

Ring buffers for traffic class seven (TC7) 302A and traffic class six (TC6) 302B are illustrated. Ring buffers are data structures in the application or middleware memory space and are used to store packets for the data stream. Each ring buffer uses a head pointer and a tail pointer to indicate the start and end of the queue. A tail pointer is used for each ring buffer 302A, 302B indicating the queue position for the next packet to be inserted into the ring buffer. As the application stores data in a ring buffer, it updates the tail pointer to point to the entry after the last valid buffer entry.

As packets are dequeued from the ring buffer, the head pointer is advanced. The NID fetches this data from the main memory into its local packet buffer, packetizes the data, and then transmits it in an appropriate gating cycle. As the NID fetches data from ring buffer, it advances the head pointer. The head pointer can be advanced until it reaches the tail pointer.

The packets are stored in the transmit packet buffer for the corresponding traffic class. Packets are transmitted during the gating cycle with the TC7 ring buffer 302A being processed first during the cycle as it has higher priority than the packets in the TC6 ring buffer 302B. Each ring buffer 302A, 302B has 50 μs of transmit time.

As evident in FIG. 3, if multiple streams belonging to same traffic class need to be transmitted, then an application must pre-process streams before it creates the ring buffer. The application would have to put multiple streams of packets in the same ring buffer and sequence them appropriately. For example in an implementation, when there are multiple streams having the same reduction ratio, the NID can schedule these streams in a round-robin fashion.

FIG. 4 is a schematic diagram illustrating transmit processing of multiple streams, according to an embodiment. In contrast to the example illustrated in FIG. 3, FIG. 4 includes two data streams per traffic class (although more streams may be used). In FIG. 4, traffic class seven (TC7) has two data streams 402A, 402B and hence, two ring buffers 404A and 404B. Traffic class six (TC6) has two data streams 402C, 402D and corresponding ring buffers 404C, 404D. Note that there is no change to the gate control list. This is because the gate control list is based on the traffic class and not the data streams. The gate control list merely provides that a traffic class gate is open for a particular time period. The gate control list does not specify the stream that is transmitted during a particular traffic class period. Instead, the reduction ratio based scheduler is used to schedule the streams based on the packet descriptors.

As described above in FIG. 1, the reduction ratio based scheduler obtains the parameters from the packet descriptors including the gating cycle offset, the reduction ratio, and the launch time offset. For each data packet placed in a given ring buffer, the reduction ratio based scheduler calculates the cycle number using the following equation:

$$\{\text{Cycle}(n+1) = \text{Cycle}(n) + \text{Reduction Ratio}\} + \text{Gating Cycle Offset}$$

where n is a positive integer.

As can be understood, given a current cycle number n, the next cycle that a packet from the data stream will be transmitted is offset by the Reduction Ratio. The Gating Cycle Offset is used to offset the entire sequence by some number of gating cycles. In effect, the Gating Cycle Offset delays the first packet from the stream to a gating cycle that occurs later than the current gating cycle. The Gating Cycle Offset is only used to offset the initial transmission. The Reduction Ratio can be used to offset packet transmission using a periodic pattern after the first packet in the stream is transmitted.

The packets may be stored in the appropriate transmit packet buffer based on the traffic class of the packet. The transmit packet buffers may be stored, sorted, or populated by cycle number so that packets that are to be transmitted in a given cycle are consecutively ordered in the ring buffer. Streams from a ring buffer may not be repeated every gating cycle. Cyclic streams that are repeated over a periodic gating cycle pattern, such as every gating cycle, every other gating cycle, every third gating cycle, etc. Acyclic streams are those streams that are not repeated with a regular periodicity.

In the example illustrated in FIG. 4, during "gating cycle 1," packets from TC7 are transmitted from each of the ring buffers 404A and 404B for 50 µs of the 100 µs gating cycle period. During the next 50 µs packets from TC6 are transmitted from each of the ring buffers 404C and 404D.

In the next "gating cycle 2," cyclic data stream packets from TC7 are transmitted from only ring buffer 404A. The ring buffer 404B has packets from a cyclic stream with a reduction ratio of "2," which means that packets from this stream are transmitted once every two cycles (alternating active cycles). Similarly, cyclic stream packets from TC6 are transmitted from only ring buffer 404C, which has a reduction ratio of "1." Those packets in ring buffer 404D are skipped in "gating cycle 2." In "gating cycle 3," packets from all of the ring buffers are transmitted. The gating cycle offset of all ring buffers is assumed to be zero.

FIG. 5 is a schematic diagram illustrating transmit processing of multiple streams with a launch time offset, according to an embodiment. The third parameter called "launch time offset" is specified with respective to each gating cycle. This parameter is obtained from the descriptor and is directly passed to the MAC circuitry for precise scheduling of a packet. FIG. 5 illustrates how the launch time offset can shift the packet launch time with respect to a base time. The launch time offset indicates that the packet is to be transmitted at a time equal to or later than the launch time offset from the base time in a gating cycle. In the example illustrated in FIG. 5, the launch time offset is different for each of TC7 and TC6 packets.

Base time is defined as the starting time of execution of entries in the gate control list. Each time the MAC circuitry executes the entire gate control list is called gate cycle time. The DMA reduction ratio based scheduler uses a PTP timestamp value to know the current time and compares it against the gating cycle base time. The reduction ratio based scheduler pushes the packets into the MAC packet queues accordingly. The base time is updated at the end of every gate cycle by the MAC circuitry.

FIG. 6 is a block diagram illustrating a descriptor 600, according to an embodiment. The descriptor 600 is a 32-bit double-word structure. Reserved fields are used to add parameters. The launch time offset is a 32-bit field and specifies a number of nanoseconds to offset a transmission within a gating cycle. The reduction ratio is an 8-bit field. This is specified in 2^n format (e.g., a bit map) with bits indicating a 1, 2, 4, 8, 16, 32, 64, or 128 periodic gating cycle. The gating cycle offset is a 8-bit field and is specified in terms of gating cycles, e.g., 0, 1, 2, etc.

Figure 7:
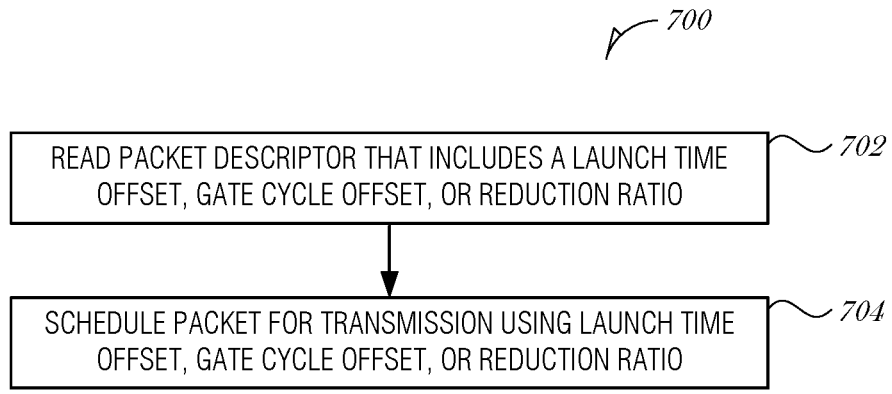
FIG. 7 is a flowchart illustrating a method for multi-stream scheduling at a network interface device, according to an embodiment.

FIG. 7 is a flowchart illustrating a method 700 for multi-stream scheduling at a network interface device, according to an embodiment. At 702, a packet descriptor is read from a descriptor cache. The packet descriptor includes at least one scheduling control parameter including: a launch time offset, a gate cycle offset, or a reduction ratio. The packet descriptor is associated with a packet stream having a traffic class.

At 704, packets from the packet stream are scheduled for transmission using the at least one scheduling control parameter.

In an embodiment, scheduling the packet includes storing the packet in a transmit queue for the traffic class. In a further embodiment, the network interface device includes one transmit queue for each traffic class of a plurality of traffic classes.

In an embodiment, the launch time offset indicates an offset from a base time of a gating cycle. When using this scheduling control parameter, scheduling packets from the packet stream includes scheduling packets to transmit at a time equal to or later than the offset from the base time during each gating cycle.

In an embodiment, the gate cycle offset indicates an offset from a current gating cycle. When using this scheduling control parameter, scheduling packets from the packet stream includes scheduling packets to begin transmitting at a gating cycle that occurs later than the current gating cycle.

In an embodiment, the reduction ratio indicates an gating cycle interval. When using this scheduling control parameter, scheduling packets from the packet stream includes scheduling packets to transmit only on gating cycles that correspond to the gating cycle interval.

In an embodiment, the method 700 includes transmitting packets from a transmit queue according to a gate control list where the packets are scheduled according to the scheduling control parameters in the packet descriptor. In a further embodiment, the gate control list includes a plurality of entries that control which traffic class of a plurality of traffic classes is able to transmit during a gating cycle.

Hardware Platform

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instructions on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 8:
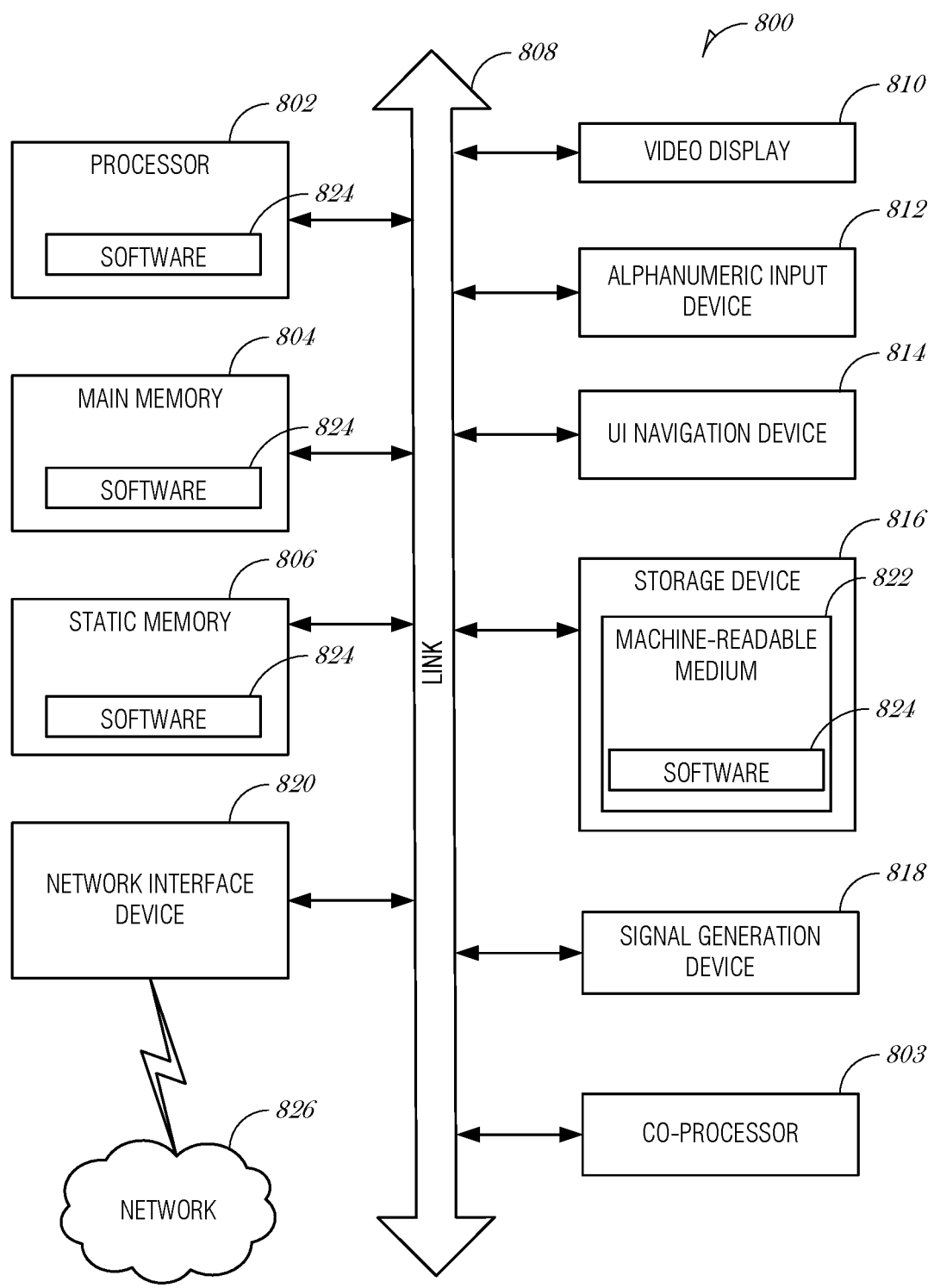
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), at least one co-processor 803 (e.g., FPGA, specialized GPU, ASIC, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Network interface device 820 may be configured or programmed to implement the methodologies described herein. In particular, the network interface device 820 may provide various aspects of packet inspection, aggregation, queuing, and processing. The network interface device 820 may also be configured or programmed to communicate with a memory management unit (MMU), processor 802, main memory 804, static memory 806, or other components of the system 800 over the link 808. The network interface device 820 may query or otherwise interface with various components of the system 800 to inspect cache memory; trigger or cease operations of a virtual machine, process, or other processing element; or otherwise interact with various computing units or processing elements that are in the system 800 or external from the system 800.

Additional Notes & Examples

Example 1 is a network interface device for multi-stream scheduling for time sensitive networking, the network interface device comprising: direct memory access (DMA) circuitry, including: descriptor parsing circuitry to read a packet descriptor from a descriptor cache, wherein the packet descriptor includes, at least one scheduling control parameter including: a launch time offset, a gate cycle offset, or a reduction ratio; wherein the packet descriptor is associated with a packet stream having a traffic class; and scheduling circuitry to schedule packets from the packet stream for transmission using the at least one scheduling control parameter.

In Example 2, the subject matter of Example 1 includes, wherein to schedule the packets from the packet stream, the scheduling circuitry is to store packets in a transmit queue for the traffic class.

In Example 3, the subject matter of Example 2 includes, wherein the network interface device includes one transmit queue for each traffic class of a plurality of traffic classes.

In Example 4, the subject matter of Examples 1-3 includes, wherein the launch time offset indicates an offset from a base time of a gating cycle, and wherein to schedule packets from the packet stream, the packets are scheduled to transmit at a time equal to or later than the offset from the base time during each gating cycle.

In Example 5, the subject matter of Examples 1-4 includes, wherein the gate cycle offset indicates an offset from a current gating cycle, and wherein to schedule packets from the packet stream, the packets are scheduled to begin transmitting at a gating cycle that occurs later than the current gating cycle.

In Example 6, the subject matter of Examples 1-5 includes, wherein the reduction ratio indicates an gating cycle interval, and wherein to schedule the packets from the packet stream, the packets are scheduled to transmit only on gating cycles that correspond to the gating cycle interval.

In Example 7, the subject matter of Examples 1-6 includes, media access control circuitry to transmit packets from a transmit queue according to a gate control list, wherein the packets are scheduled according to the scheduling control parameters in the packet descriptor.

In Example 8, the subject matter of Example 7 includes, wherein the gate control list includes a plurality of entries that control which traffic class of a plurality of traffic classes is able to transmit during a gating cycle.

Example 9 is a method for multi-stream scheduling at a network interface device, the method including: reading a packet descriptor from a descriptor cache, wherein the packet descriptor includes, at least one scheduling control parameter including: a launch time offset, a gate cycle offset, or a reduction ratio; wherein the packet descriptor is associated with a packet stream having a traffic class; and scheduling packets from the packet stream for transmission using the at least one scheduling control parameter.

In Example 10, the subject matter of Example 9 includes, wherein scheduling the packets includes storing the packet in a transmit queue for the traffic class.

In Example 11, the subject matter of Example 10 includes, wherein the network interface device includes one transmit queue for each traffic class of a plurality of traffic classes.

In Example 12, the subject matter of Examples 9-11 includes, wherein the launch time offset indicates an offset from a base time of a gating cycle, and wherein scheduling packets from the packet stream includes scheduling packets to transmit at a time equal to or later than the offset from the base time during each gating cycle.

In Example 13, the subject matter of Examples 9-12 includes, wherein the gate cycle offset indicates an offset from a current gating cycle, and wherein scheduling packets from the packet stream includes scheduling packets to begin transmitting at a gating cycle that occurs later than the current gating cycle.

In Example 14, the subject matter of Examples 9-13 includes, wherein the reduction ratio indicates an gating cycle interval, and wherein scheduling packets from the packet stream includes scheduling packets to transmit only on gating cycles that correspond to the gating cycle interval.

In Example 15, the subject matter of Examples 9-14 includes, transmitting packets from a transmit queue according to a gate control list, wherein the packets are scheduled according to the scheduling control parameters in the packet descriptor.

In Example 16, the subject matter of Example 15 includes, wherein the gate control list includes a plurality of entries that control which traffic class of a plurality of traffic classes is able to transmit during a gating cycle.

Example 17 is at least one machine-readable medium including instructions, which when executed by a machine, cause the machine to perform operations of any of the methods of Examples 9-16.

Example 18 is an apparatus comprising means for performing any of the methods of Examples 9-16.

Example 19 is at least one machine-readable medium including instructions, which when executed by a network interface device, cause the network interface device to perform operations comprising: reading a packet descriptor from a descriptor cache, wherein the packet descriptor includes, at least one scheduling control parameter including: a launch time offset, a gate cycle offset, or a reduction ratio; wherein the packet descriptor is associated with a packet stream having a traffic class; and scheduling packets from the packet stream for transmission using the at least one scheduling control parameter.

In Example 20, the subject matter of Example 19 includes, wherein scheduling the packets includes storing the packet in a transmit queue for the traffic class.

In Example 21, the subject matter of Example 20 includes, wherein the network interface device includes one transmit queue for each traffic class of a plurality of traffic classes.

In Example 22, the subject matter of Examples 19-21 includes, wherein the launch time offset indicates an offset from a base time of a gating cycle, and wherein scheduling packets from the packet stream includes scheduling packets to transmit at a time equal to or later than the offset from the base time during each gating cycle.

In Example 23, the subject matter of Examples 19-22 includes, wherein the gate cycle offset indicates an offset from a current gating cycle, and wherein scheduling packets from the packet stream includes scheduling packets to begin transmitting at a gating cycle that occurs later than the current gating cycle.

In Example 24, the subject matter of Examples 19-23 includes, wherein the reduction ratio indicates an gating cycle interval, and wherein scheduling packets from the packet stream includes scheduling packets to transmit only on gating cycles that correspond to the gating cycle interval.

In Example 25, the subject matter of Examples 19-24 includes, transmitting packets from a transmit queue according to a gate control list, wherein the packets are scheduled according to the scheduling control parameters in the packet descriptor.

In Example 26, the subject matter of Example 25 includes, wherein the gate control list includes a plurality of entries that control which traffic class of a plurality of traffic classes is able to transmit during a gating cycle.

Example 27 is a network interface device comprising: means for reading a packet descriptor from a descriptor cache, wherein the packet descriptor includes, at least one scheduling control parameter including: a launch time offset, a gate cycle offset, or a reduction ratio; wherein the packet descriptor is associated with a packet stream having a traffic class; and means for scheduling packets from the packet stream for transmission using the at least one scheduling control parameter.

In Example 28, the subject matter of Example 27 includes, wherein the means for scheduling packets includes means for storing the packets in a transmit queue for the traffic class.

In Example 29, the subject matter of Example 28 includes, wherein the network interface device includes one transmit queue for each traffic class of a plurality of traffic classes.

In Example 30, the subject matter of Examples 27-29 includes, wherein the launch time offset indicates an offset from a base time of a gating cycle, and wherein the means for scheduling packets from the packet stream include means for scheduling packets to transmit at a time equal to or later than the offset from the base time during each gating cycle.

In Example 31, the subject matter of Examples 27-30 includes, wherein the gate cycle offset indicates an offset from a current gating cycle, and wherein the means for scheduling packets from the packet stream include means for scheduling packets to begin transmitting at a gating cycle that occurs later than the current gating cycle.

In Example 32, the subject matter of Examples 27-31 includes, wherein the reduction ratio indicates an gating cycle interval, and wherein the means for scheduling packets from the packet stream include means for scheduling packets to transmit only on gating cycles that correspond to the gating cycle interval.

In Example 33, the subject matter of Examples 27-32 includes, means for transmitting packets from a transmit queue according to a gate control list, wherein the packets are scheduled according to the scheduling control parameters in the packet descriptor.

In Example 34, the subject matter of Example 33 includes, wherein the gate control list includes a plurality of entries that control which traffic class of a plurality of traffic classes is able to transmit during a gating cycle.

Example 35 is an edge computing system, comprising a plurality of edge computing nodes, the plurality of edge computing nodes configured with the biometric security methods of any of the examples of 1-34.

Example 36 is an edge computing node, operable in an edge computing system, comprising processing circuitry configured to implement any of the examples of 1-34.

Example 37 is an edge computing node, operable as a server in an edge computing system, configured to perform any of the examples of 1-34.

Example 38 is an edge computing node, operable as a client in an edge computing system, configured to perform any of the examples of 1-34.

Example 39 is an edge computing node, operable in a layer of an edge computing network as an aggregation node, network hub node, gateway node, or core data processing node, configured to perform any of the examples of 1-34.

Example 40 is an edge computing network, comprising networking and processing components configured to provide or operate a communications network, to enable an edge computing system to implement any of the examples of 1-34.

Example 41 is an access point, comprising networking and processing components configured to provide or operate a communications network, to enable an edge computing system to implement any of the examples of 1-34.

Example 42 is a base station, comprising networking and processing components configured to provide or operate a communications network, to enable an edge computing system to implement any of the examples of 1-34.

Example 43 is a road-side unit, comprising networking components configured to provide or operate a communications network, to enable an edge computing system to implement any of the examples of 1-34.

Example 44 is an on-premise server, operable in a private communications network distinct from a public edge computing network, the server configured to enable an edge computing system to implement any of the examples of 1-34.

Example 45 is a 3GPP 4G/LTE mobile wireless communications system, comprising networking and processing components configured with the biometric security methods of any of the examples of 1-34.

Example 46 is a 5G network mobile wireless communications system, comprising networking and processing components configured with the biometric security methods of any of the examples of 1-34.

Example 47 is a user equipment device, comprising networking and processing circuitry, configured to connect with an edge computing system configured to implement any of the examples of 1-34.

Example 48 is a client computing device, comprising processing circuitry, configured to coordinate compute operations with an edge computing system, the edge computing system configured to implement any of the examples of 1-34.

Example 49 is an edge provisioning node, operable in an edge computing system, configured to implement any of the examples of 1-34.

Example 50 is a service orchestration node, operable in an edge computing system, configured to implement any of the examples of 1-34.

Example 51 is an application orchestration node, operable in an edge computing system, configured to implement any of the examples of 1-34.

Example 52 is a multi-tenant management node, operable in an edge computing system, configured to implement any of the examples of 1-34.

Example 53 is an edge computing system comprising processing circuitry, the edge computing system configured to operate one or more functions and services to implement any of the examples of 1-34.

Example 54 is networking hardware with network functions implemented thereupon, operable within an edge computing system configured with the biometric security methods of any of examples of 1-34.

Example 55 is acceleration hardware with acceleration functions implemented thereupon, operable in an edge computing system, the acceleration functions configured to implement any of the examples of 1-34.

Example 56 is storage hardware with storage capabilities implemented thereupon, operable in an edge computing system, the storage hardware configured to implement any of the examples of 1-34.

Example 57 is computation hardware with compute capabilities implemented thereupon, operable in an edge computing system, the computation hardware configured to implement any of the examples of 1-34.

Example 58 is an edge computing system adapted for supporting vehicle-to-vehicle (V2V), vehicle-to-everything (V2X), or vehicle-to-infrastructure (V2I) scenarios, configured to implement any of the examples of 1-34.

Example 59 is an edge computing system adapted for operating according to one or more European Telecommunications Standards Institute (ETSI) Multi-Access Edge Computing (MEC) specifications, the edge computing system configured to implement any of the examples of 1-34.

Example 60 is an edge computing system adapted for operating one or more multi-access edge computing (MEC) components, the MEC components provided from one or more of: a MEC proxy, a MEC application orchestrator, a MEC application, a MEC platform, or a MEC service, according to an European Telecommunications Standards Institute (ETSI) Multi-Access Edge Computing (MEC) configuration, the MEC components configured to implement any of the examples of 1-34.

Example 61 is an edge computing system configured as an edge mesh, provided with a microservice cluster, a microservice cluster with sidecars, or linked microservice clusters with sidecars, configured to implement any of the examples of 1-34.

Example 62 is an edge computing system, comprising circuitry configured to implement one or more isolation environments provided among dedicated hardware, virtual machines, containers, virtual machines on containers, configured to implement any of the examples of 1-34.

Example 63 is an edge computing server, configured for operation as an enterprise server, roadside server, street cabinet server, or telecommunications server, configured to implement any of the examples of 1-34.

Example 64 is an edge computing system configured to implement any of the examples of 1-34 with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 65 is an edge computing system, comprising computing nodes operated by multiple owners at different geographic locations, configured to implement any of the examples of 1-34.

Example 66 is a cloud computing system, comprising data servers operating respective cloud services, the respective cloud services configured to coordinate with an edge computing system to implement any of the examples of 1-34.

Example 67 is a server, comprising hardware to operate cloudlet, edgelet, or applet services, the services configured to coordinate with an edge computing system to implement any of the examples of 1-34.

Example 68 is an edge node in an edge computing system, comprising one or more devices with at least one processor and memory to implement any of the examples of 1-34.

Example 69 is an edge node in an edge computing system, the edge node operating one or more services provided from among: a management console service, a telemetry service, a provisioning service, an application or service orchestration service, a virtual machine service, a container service, a function deployment service, or a compute deployment service, or an acceleration management service, the one or more services configured to implement any of the examples of 1-34.

Example 70 is a set of distributed edge nodes, distributed among a network layer of an edge computing system, the network layer comprising a close edge, local edge, enterprise edge, on-premise edge, near edge, middle, edge, or far edge network layer, configured to implement any of the examples of 1-34.

Example 71 is an apparatus of an edge computing system comprising: one or more processors and one or more computer-readable media comprising instructions that, when executed by the one or more processors, cause the one or more processors to perform any of the examples of 1-34.

Example 72 is one or more computer-readable storage media comprising instructions to cause an electronic device of an edge computing system, upon execution of the instructions by one or more processors of the electronic device, to perform any of the examples of 1-34.

Example 73 is a communication signal communicated in an edge computing system, to perform any of the examples of 1-34.

Example 74 is a data structure communicated in an edge computing system, the data structure comprising a datagram, packet, frame, segment, protocol data unit (PDU), or message, to perform any of the examples of 1-34.

Example 75 is a signal communicated in an edge computing system, the signal encoded with a datagram, packet, frame, segment, protocol data unit (PDU), message, or data to perform any of the examples of 1-34.

Example 76 is an electromagnetic signal communicated in an edge computing system, the electromagnetic signal carrying computer-readable instructions, wherein execution of the computer-readable instructions by one or more processors causes the one or more processors to perform any of the examples of 1-34.

Example 77 is a computer program used in an edge computing system, the computer program comprising instructions, wherein execution of the program by a processing element in the edge computing system is to cause the processing element to perform any of the examples of 1-34.

Example 78 is an apparatus of an edge computing system comprising means to perform any of the examples of 1-34.

Example 79 is an apparatus of an edge computing system comprising logic, modules, or circuitry to perform any of the examples of 1-34.

Example 80 is at least one machine-readable medium including instructions that, when executed by processing circuitry, cause the processing circuitry to perform operations to implement of any of Examples 1-79.

Example 81 is an apparatus comprising means to implement of any of Examples 1-79.

Example 82 is a system to implement of any of Examples 1-79.

Example 83 is a method to implement of any of Examples 1-79.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A network interface device for multi-stream scheduling for time sensitive networking, the network interface device comprising:
    direct memory access (DMA) circuitry, including:
        descriptor parsing circuitry to read a packet descriptor from a descriptor cache, wherein the packet descriptor includes at least one scheduling control parameter including: a launch time offset, a gate cycle offset, or a reduction ratio;
        wherein the packet descriptor is associated with a packet stream having a traffic class; and
        scheduling circuitry to schedule packets from the packet stream for transmission using the at least one scheduling control parameter;
        wherein when the at least one scheduling control parameter includes the launch time offset, the launch time offset indicating an offset from a base time of a gating cycle, and wherein to schedule packets from the packet stream, the packets are scheduled to transmit at a time equal to or later than the offset from the base time during each gating cycle;
        wherein when the at least one scheduling control parameter includes the gate cycle offset, the gate cycle offset indicating an offset from a current gating cycle, and wherein to schedule packets from the packet stream, the packets are scheduled to begin transmitting at a gating cycle that occurs later than the current gating cycle;
        wherein when the at least one scheduling control parameter includes the reduction ratio, the reduction ratio indicating a gating cycle interval, and wherein to schedule the packets from the packet stream, the packets are scheduled to transmit only on gating cycles that correspond to the gating cycle interval.

2. The network interface device of claim 1, wherein to schedule the packets from the packet stream, the scheduling circuitry is to store packets in a transmit queue for the traffic class.

3. The network interface device of claim 2, wherein the network interface device includes one transmit queue for each traffic class of a plurality of traffic classes.

4. The network interface device of claim 1, including:
    media access control circuitry to transmit packets from a transmit queue according to a gate control list, wherein the packets are scheduled according to the scheduling control parameters in the packet descriptor.

5. The network interface device of claim 4, wherein the gate control list includes a plurality of entries that control which traffic class of a plurality of traffic classes is able to transmit during a gating cycle.

6. A method for multi-stream scheduling at a network interface device, the method including:
    reading a packet descriptor from a descriptor cache, wherein the packet descriptor includes at least one scheduling control parameter including: a launch time offset, a gate cycle offset, or a reduction ratio, wherein the packet descriptor is associated with a packet stream having a traffic class; and
    scheduling packets from the packet stream for transmission using the at least one scheduling control parameter;
    wherein when the at least one scheduling control parameter includes the launch time offset, the launch time offset indicating an offset from a base time of a gating cycle, and wherein to schedule packets from the packet stream, the packets are scheduled to transmit at a time equal to or later than the offset from the base time during each gating cycle;

wherein when the at least one scheduling control parameter includes the gate cycle offset, the gate cycle offset indicating an offset from a current gating cycle, and wherein to schedule packets from the packet stream, the packets are scheduled to begin transmitting at a gating cycle that occurs later than the current gating cycle;

wherein when the at least one scheduling control parameter includes the reduction ratio, the reduction ratio indicating a gating cycle interval, and wherein to schedule the packets from the packet stream, the packets are scheduled to transmit only on gating cycles that correspond to the gating cycle interval.

7. The method of claim 6, wherein scheduling the packets includes storing the packets in a transmit queue for the traffic class.

8. The method of claim 7, wherein the network interface device includes one transmit queue for each traffic class of a plurality of traffic classes.

9. The method of claim 6, including:
transmitting packets from a transmit queue according to a gate control list, wherein the packets are scheduled according to the scheduling control parameters in the packet descriptor.

10. The method of claim 9, wherein the gate control list includes a plurality of entries that control which traffic class of a plurality of traffic classes is able to transmit during a gating cycle.

11. At least one non-transitory machine-readable medium including instructions, which when executed by a network interface device, cause the network interface device to perform operations comprising:
reading a packet descriptor from a descriptor cache, wherein the packet descriptor includes at least one scheduling control parameter including: a launch time offset, a gate cycle offset, or a reduction ratio, wherein the packet descriptor is associated with a packet stream having a traffic class; and
scheduling packets from the packet stream for transmission using the at least one scheduling control parameter;

wherein when the at least one scheduling control parameter include the launch time offset, the launch time offset indicating an offset from a base time of a gating cycle, and wherein to schedule packets from the packet stream, the packets are scheduled to transmit at a time equal to or later than the offset from the base time during each gating cycle;

wherein when the at least one scheduling control parameter includes the gate cycle offset, the gate cycle offset indicating an offset from a current gating cycle, and wherein to schedule packets from the packet stream, the packets are scheduled to begin transmitting at a gating cycle that occurs later than the current gating cycle;

wherein when the at least one scheduling control parameter includes the reduction ratio, the reduction ratio indicating a gating cycle interval, and wherein to schedule the packets from the packet stream, the packets are scheduled to transmit only on gating cycles that correspond to the gating cycle interval.

12. The at least one machine-readable medium of claim 11, wherein scheduling the packets includes storing the packets in a transmit queue for the traffic class.

13. The at least one machine-readable medium of claim 12, wherein the network interface device includes one transmit queue for each traffic class of a plurality of traffic classes.

14. The at least one machine-readable medium of claim 11, including:
transmitting packets from a transmit queue according to a gate control list, wherein the packets are scheduled according to the scheduling control parameters in the packet descriptor.

15. The at least one machine-readable medium of claim 14, wherein the gate control list includes a plurality of entries that control which traffic class of a plurality of traffic classes is able to transmit during a gating cycle.

* * * * *